(12) United States Patent
Hsiao et al.

(10) Patent No.: US 6,947,255 B2
(45) Date of Patent: Sep. 20, 2005

(54) MAGNETIC HEAD HAVING A NOTCHED POLE PIECE STRUCTURE AND METHOD OF MAKING THE SAME

(75) Inventors: Wen-Chein David Hsiao, San Jose, CA (US); Jyh-Shuey Jerry Lo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 10/105,119

(22) Filed: Mar. 22, 2002

(65) Prior Publication Data

US 2003/0179498 A1 Sep. 25, 2003

(51) Int. Cl.$^7$ .............................................. G11B 5/147
(52) U.S. Cl. ...................................... 360/126; 29/603.14
(58) Field of Search ........... 360/126; 29/603.11–603.14

(56) References Cited

U.S. PATENT DOCUMENTS

| | | | |
|---|---|---|---|
| 5,438,747 A | 8/1995 | Krounbi et al. | |
| 5,639,509 A | 6/1997 | Schemmel | |
| 5,649,351 A | 7/1997 | Cole et al. | |
| 5,719,730 A | 2/1998 | Chang et al. | |
| 5,805,391 A | 9/1998 | Chang et al. | |
| 5,809,637 A | 9/1998 | Rottmayer | |
| 5,901,432 A * | 5/1999 | Armstrong et al. | 29/603.14 |
| 6,029,339 A | 2/2000 | Chang et al. | |
| 6,043,960 A | 3/2000 | Chang et al. | |
| 6,069,775 A | 5/2000 | Chang et al. | |
| 6,119,331 A | 9/2000 | Chang et al. | |
| 6,130,809 A | 10/2000 | Santini | |
| 6,141,857 A * | 11/2000 | Furusawa et al. | 29/603.15 |
| 6,201,670 B1 | 3/2001 | Chang et al. | |
| 6,400,526 B2 * | 6/2002 | Crue et al. | 360/126 |
| 6,493,191 B1 * | 12/2002 | Cain et al. | 360/246.2 |
| 6,552,874 B1 * | 4/2003 | Chen et al. | 360/126 |
| 6,618,223 B1 * | 9/2003 | Chen et al. | 360/126 |
| 6,693,769 B2 * | 2/2004 | Hsu et al. | 360/126 |
| 6,721,138 B1 * | 4/2004 | Chen et al. | 360/317 |
| 6,724,572 B1 * | 4/2004 | Stoev et al. | 360/126 |
| 6,785,955 B1 * | 9/2004 | Chen et al. | 29/603.24 |
| 2002/0181162 A1 * | 12/2002 | Chen et al. | 360/317 |
| 2003/0179497 A1 * | 9/2003 | Harris et al. | 360/126 |

* cited by examiner

*Primary Examiner*—Allen Cao
(74) *Attorney, Agent, or Firm*—John J. Oskorep

(57) ABSTRACT

A magnetic head having an improved fringing field and overwrite capability, and a method of making the same, are described. The method includes the acts of frame plating a pedestal over a first pole piece; depositing an insulator over the first pole piece and plated pedestal; chemically mechanically polishing (CMP) the top of the insulator to expose a top of the plated pedestal; depositing a gap layer over the top of the insulator and plated pedestal; depositing a seed layer over the gap layer; forming a second pole piece over the seed layer; ion milling, using the second pole piece as a mask, such that end portions of the seed layer are removed and a central portion remains; reactive ion milling, using the central portion of the seed layer as a mask, such that end portions of the gap layer are removed and a central portion of the gap layer having a width that is greater than a width of the second pole piece is formed; and ion milling the plated pedestal, using the central portion of the gap layer as a mask, to form a central notched structure having angled side walls of 25 degrees±24 degrees relative to normal.

19 Claims, 11 Drawing Sheets

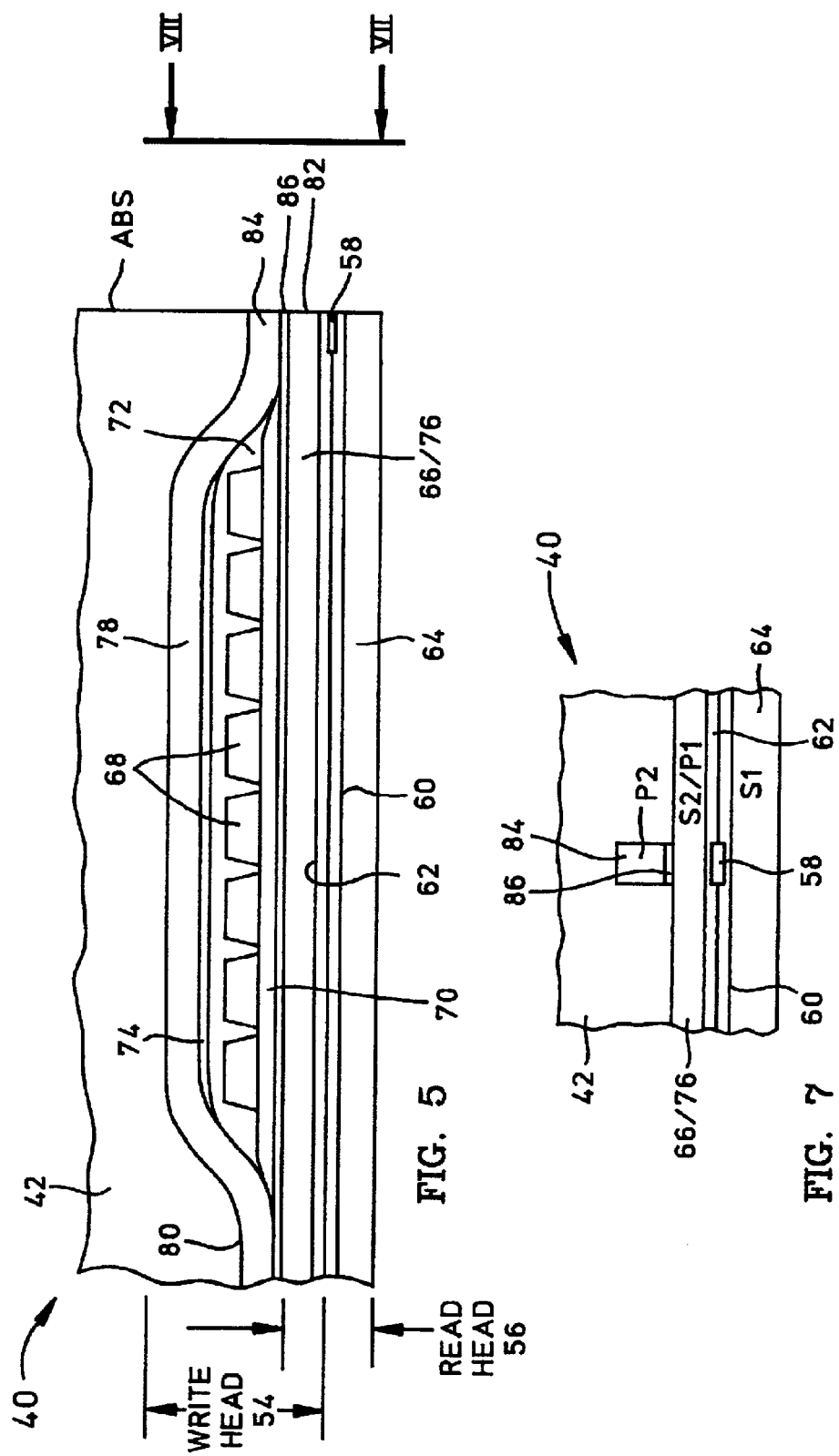

MAGNETIC HEAD HAVING A NOTCHED POLE PIECE STRUCTURE AND METHOD OF MAKING THE SAME

BACKGROUND OF THE INVENTION

1. Field of the Invention

This invention relates generally to magnetic heads in disk drives, and more particularly to magnetic write heads with notched pole piece structures and methods of making the same.

2. Description of the Related Art

A write head is typically combined with a magnetoresistive (MR) read head to form a merged MR head, certain elements of which are exposed at an air bearing surface (ABS). The write head comprises first and second pole pieces connected at a back gap that is recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to, and a short distance (fly height) from, the ABS so that the write fields magnetize the disk along circular tracks. The written circular tracks then contain information in the form of magnetized segments with fields detectable by the MR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a change in resistance that corresponds to the strength of the fields. A sense current is conducted through the MR sensor, where changes in resistance cause voltage changes that are received by the processing circuitry as readback signals.

One or more merged MR heads may be employed in a magnetic disk drive for reading and writing information on circular tracks of a rotating disk. A merged MR head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically on the order of about 0.05 µm.

The second pole, along with its second pole tip, is frame-plated on top of the gap layer. After depositing a seed layer on the gap layer, a photoresist layer is spun on the seed layer, imaged with light, and developed to provide an opening surrounded by a resist wall for plating the second pole piece and second pole tip. To produce a second pole tip with a narrow track width, the photoresist layer has to be correspondingly thin.

Once the second pole tip is formed, it is desirable to notch the first pole piece opposite the first and second bottom corners of the second pole tip. Notching the first pole piece minimizes side writing in tracks written on the magnetic disk. As is known, when the tracks are overwritten by side writing the track density of the magnetic disk is reduced. When the first pole piece is notched, it has first and second side walls that are aligned with first and second side walls of the second pole tip, so that the first pole piece and the second pole tip have the same track width at the ABS. This minimizes fringing of magnetic fields from the second pole tip laterally beyond the track width (side writing) to a wide expanse of the first pole piece.

A prior art process for notching the first pole piece entails ion beam milling the gap layer and the first pole piece, employing the second pole tip as a mask. According to this prior art process (typified in U.S. Pat. No. 5,452,164 and U.S. Pat. No. 5,438,747), the gap layer is typically alumina, and the first and second pole pieces and pole tips are typically Permalloy (NiFe). Alumina mills more slowly than Permalloy; thus the top of second pole tip and a top surface of the first pole piece are milled more quickly than the gap layer. Further, during ion milling, there is significant redeposition of alumina on surfaces of the workpiece. The milling ion beam is typically directed at an angle with respect to a normal to the layers, in order that milling and clean-up be done simultaneously.

Notching the first pole piece is very time consuming due, in part, to shadowing of the notch sites by the angled milling and by the profile of the second pole tip, as the wafer supporting the magnetic head is rotated. The length of milling time is due more, however, to the large lateral expanse of the first pole piece. Since the top and side walls of the second pole tip are also milled while the first pole piece is being notched, the second pole tip has to be formed with extra thickness and width so that, after notching is completed, the second pole tip is at its target height and target track width. Unfortunately, because of the long time required for notching it is difficult to meet the targets within acceptable tolerances. This lowers the manufacturing yield. Also, the extra height of the initially formed second pole tip increases the aspect ratio and reduces the line width of the second pole tip.

In order to minimize overmilling of the first pole piece, another process removes the gap layer, except for a desired portion between the first and second pole tips, by a wet-etchant. After the unwanted portions of the gap layer are removed, the first pole piece is ion milled, employing the second pole tip as a mask. This process eliminates significant redeposition of the alumina. A problem with this process, however, is that the etching undercuts the gap layer under the base of the second pole tip, which is a critical area for the transfer of field signals. The undercut regions provide spaces where Permalloy can be redeposited during subsequent ion milling of the first pole piece, or other foreign material can be redeposited upon subsequent milling and clean-up steps. Further, if the track width of the second pole tip is in the order of 1 µm, the etchant may release the second pole tip from the gap layer, thus ruining the head.

Accordingly, what is needed is an improved method to make such magnetic heads with better fringing fields and overwrite capabilities.

SUMMARY OF THE INVENTION

As described herein, a first aspect of the present invention involves a magnetic write head which has a unique pre-plated pedestal having notched angled side walls for providing a better fringing field and overwrite capability. A second aspect of the present invention involves a method of making such a magnetic head.

In accordance with the first inventive aspect, a magnetic head is made of a first pole piece; a second pole piece; a unique pre-plated notched structure formed over a central portion of the first pole piece; and a gap separating the notched structure from the second pole piece. Advantageously, the notched structure is formed with angled side walls for an improved fringing field and overwrite capability. Preferably, the angle of each angled side wall is 25 degrees±24 degrees relative to normal. This notched structure may have a top straight-walled portion over the angled-walled portion, a bottom straight-walled portion underneath the angled-walled portion, or both.

In accordance with the second inventive aspect, a method of making such a magnetic head includes the acts of frame plating a pedestal over a first pole piece; depositing an insulator over the first pole piece and plated pedestal; chemically mechanically polishing (CMP) the top of insulator to expose a top of the plated pedestal; depositing a gap layer over the top of insulator and plated pedestal; depositing a seed layer over the gap layer; forming a second pole piece over the seed layer; ion milling, using the second pole piece as a mask, so that end portions of the seed layer are removed and a central portion remains; reactive ion milling, using the central portion of the seed layer as a mask, such that end portions of the gap layer are removed and a central portion of the gap layer having a width that is greater than a width of the second pole piece remains; and ion milling the plated pedestal, using the central portion of the gap layer as a mask, to form a central notched structure having the angled side walls. The angled side walls are formed due to the shadowing effect and the decreasing size of the central portion of the gap layer during the ion milling process.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V—V of FIG. 2;

FIG. 7 is a partial ABS view of the slider taken along plane VII—VII of FIG. 5 to show the read and write elements of the magnetic head;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
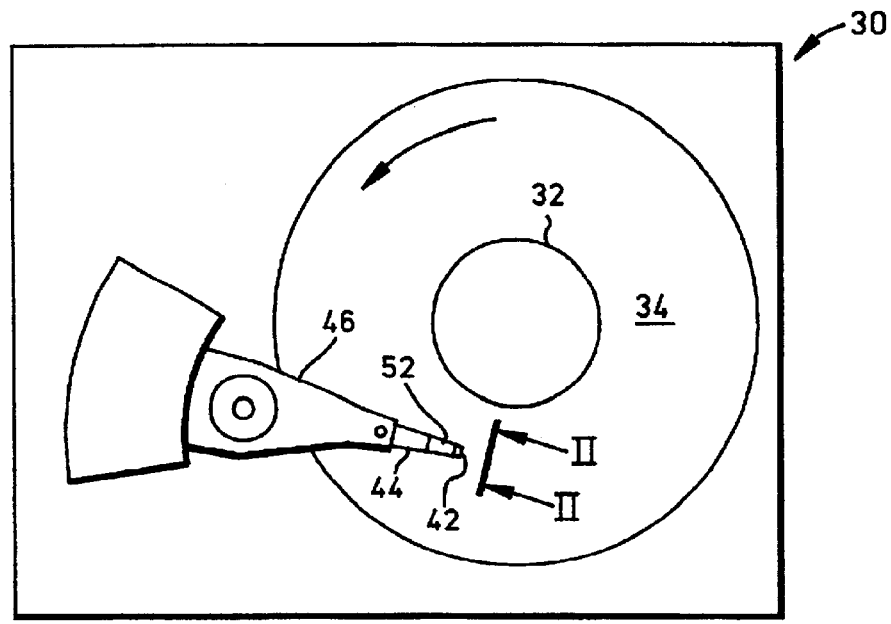
FIG. 1 is a planar view of an exemplary magnetic disk drive.
Figure 2:
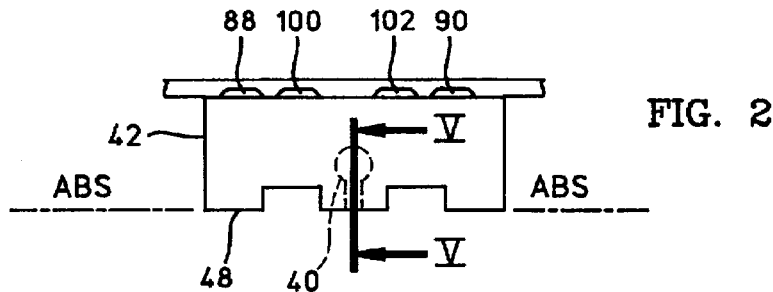
FIG. 2 is an end view of a slider with a magnetic head of the disk drive as seen in plane II—II.
Figure 3:
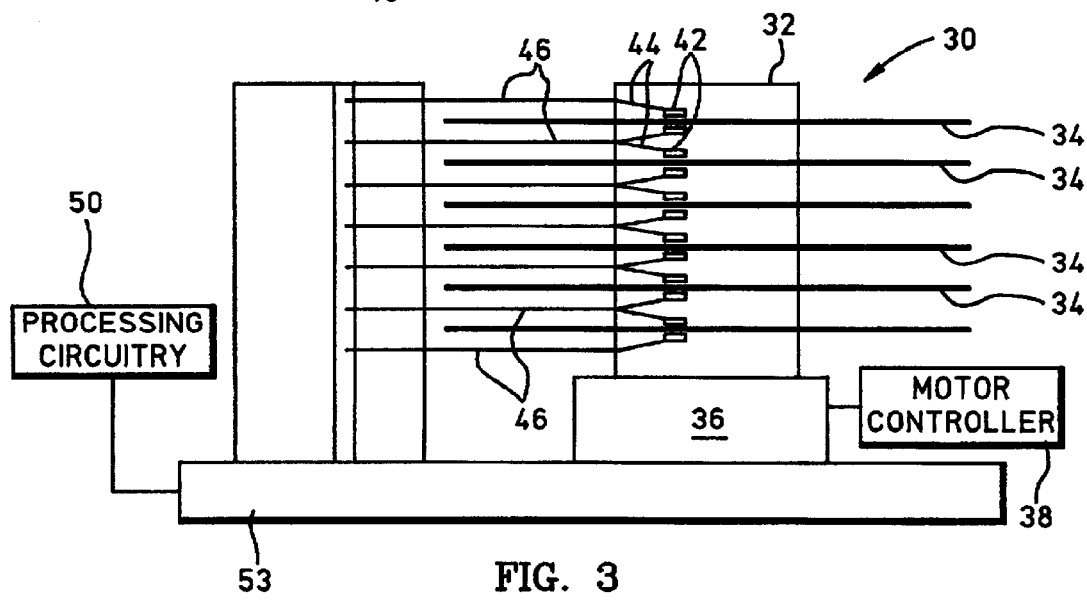
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is mounted on a slider 42. The slider 42 is supported by a suspension 44 and actuator arm 46. A plurality of disks, sliders and suspensions may be employed in a large capacity direct access storage device (DASD), as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 µm) cushion of air (air bearing) between the disk and an air bearing surface (ABS) 48.

Figure 4:
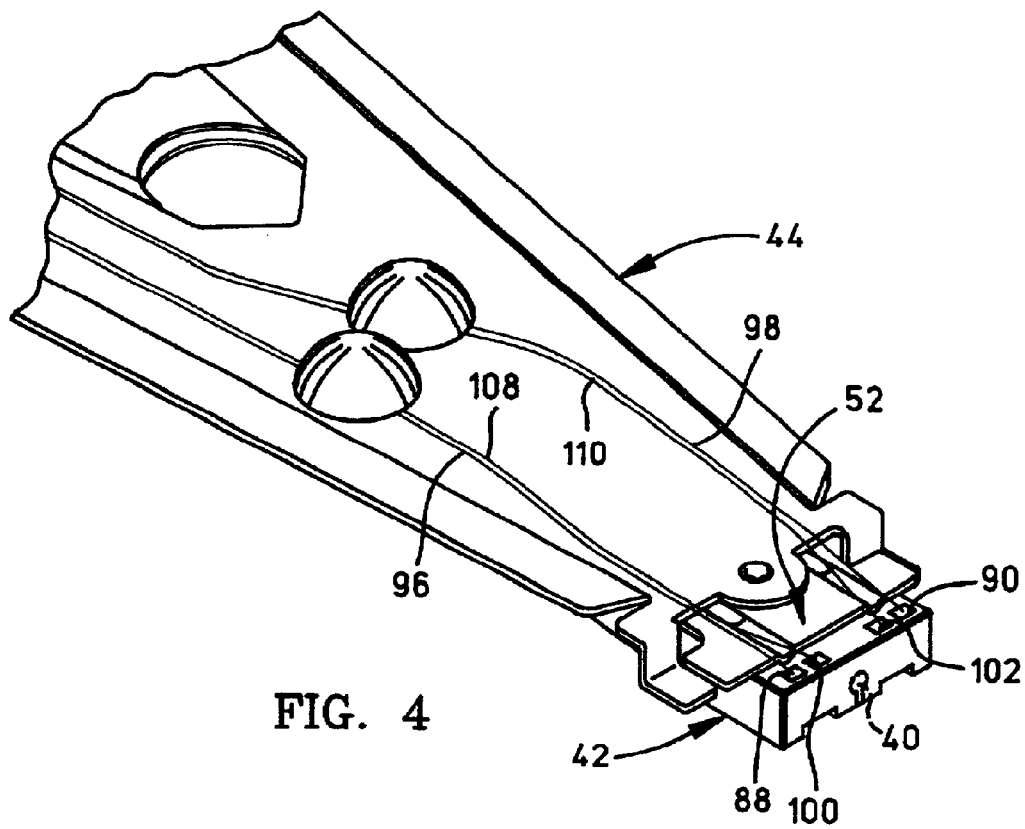
FIG. 4 is an isometric illustration of an exemplary suspension system for supporting the slider and magnetic head.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 that is mounted to the suspension 44. All of the above components are supported on a base 53.

FIG. 5 is a side cross-sectional elevation view of a merged magnetoresistive (MR) head 40, with a write head portion 54 and a read head portion 56. The read head portion includes an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes, which are processed by the processing circuitry 50 shown in FIG. 3.

Figure 6:
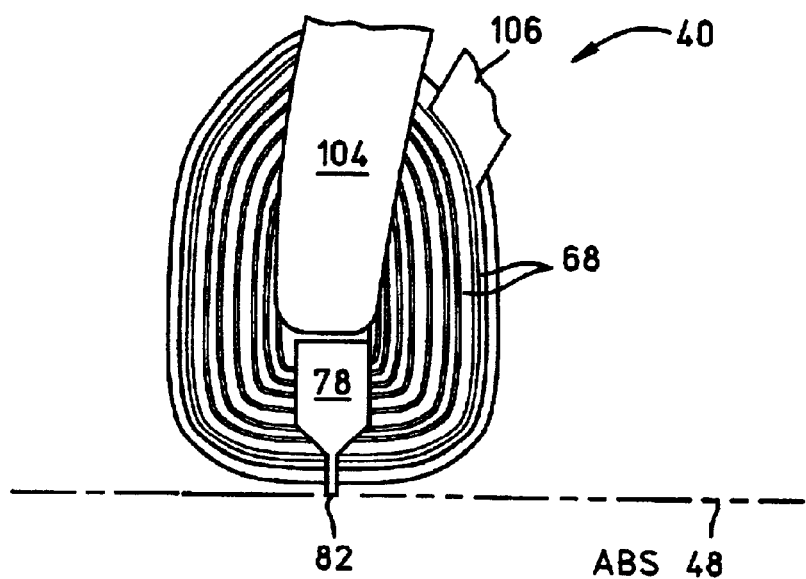
FIG. 6 is a top view of the second pole piece and coil layer, a portion of which is shown in FIG. 5, with all insulation material removed.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to as an "insulation stack". The coil layer 68, and the first, second and third insulation layers 70, 72 and 74, are sandwiched between first and second pole piece layers 76 and 78. The first and second pole piece layers 76 and 78 are magnetically coupled at a back gap 80, and have first and second pole tips 82 and 84 that are separated by a nonmagnetic gap layer 86 at the ABS. As shown in FIGS. 2 and 4, first and second solder connections 88 and 90 connect leads (not shown) from the MR sensor 58 to leads 96 and 98 on the suspension 44; third and fourth solder connections 100 and 102 connect leads 104 and 106 from the coil 68 (see FIG. 6) to leads 108 and 110 on the suspension.

Figure 8:
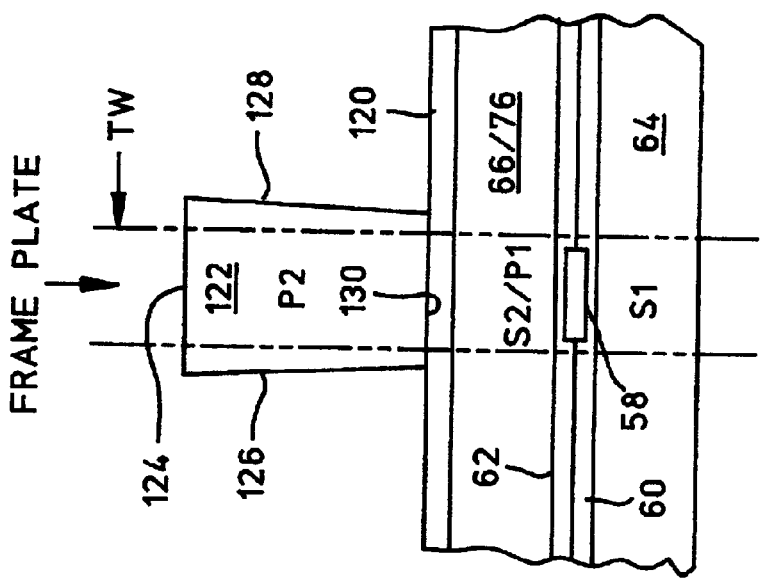
FIG. 8 is an ABS of a prior art head prior to notching the first pole piece.

FIG. 8 shows an ABS view of a prior art merged magnetic head, in which the second shield of the read head and the first pole piece of the write head are a common layer 66/76. The gap layer 120 has been formed on the first pole piece layer 66/76, followed by frame plating a second pole tip 122 on the gap layer 120. The second pole tip 122 is a front portion of the second pole piece. The second pole tip is bounded by a top 124, first and second side walls 126 and 128, and a base 130. The target track width (TW) is shown in FIG. 8. Since the first pole piece will be notched by ion milling, the second pole tip 122 is larger than a target size track width (TW) of the second pole tip, so as to allow for consumption of the second pole tip during a subsequent milling cycle. Accordingly, before milling, the first and second side walls 126 and 128 extend beyond the track width, and the top 124 is higher than the target height. The dimensions of these sacrificial portions is referred to in the art as windage.

Figure 9:
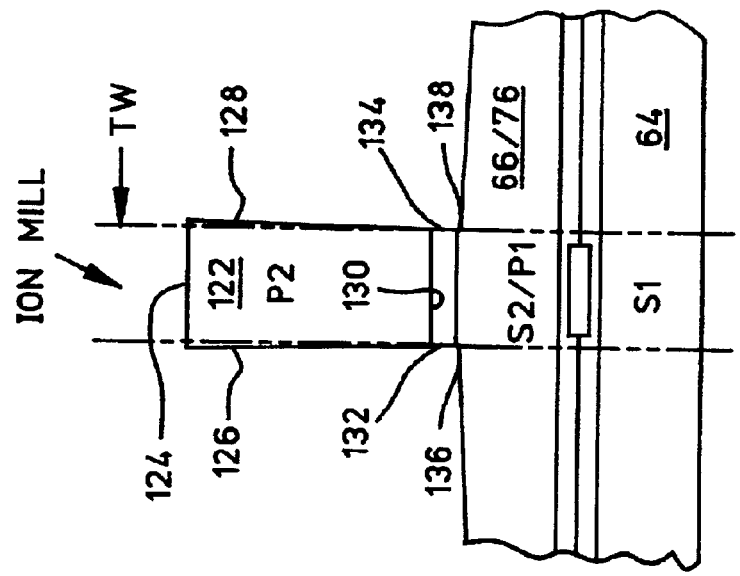
FIG. 9 is an ABS view of the prior art head of FIG. 8 after the first pole piece is formed with notches by milling.

In FIG. 9 ion milling is employed to mill through the gap layer to form a write gap 130 with first and second side walls 132 and 134, and to mill notches into the first pole piece 66/76 with first and second side walls 136 and 138. After milling, the first side walls 126, 132 and 136 are contiguous, and the second side walls 128, 134 and 138 are contiguous. This notching improves the transfer of flux between the second pole tip 122 and the first pole piece 66/76, since the flux will transfer to the pedestal portion of the first pole piece instead of the larger expanse thereof. This reduces side writing by the write head. The milling is at an angle to a normal to the layers 66/76 and 64 in order to minimize redeposition of the milled material. It should be understood that the partially completed magnetic head in FIG. 9 rests upon a substrate (not shown) that is rotated during the milling cycle. The second pole tip is employed as a mask for forming the write gap 130 and notching the first pole piece at 136 and 138. It can be seen that this causes shadowing at the notching sites 136 and 138 during approximately 180 degrees of the rotation, due to the angle of the milling. This shadowing increases the processing time required to form the notches in the first pole piece. It should be noted that the downward sloping portions of the first pole piece layer 62 in FIG. 9 are formed due to the shadowing by the second pole tip 122.

After milling, the second pole tip 122 has been reduced in size. With the prior art method it is very difficult to reduce the second pole tip 122 to the target track width and the target height because of the significant time required for milling the large lateral expanse of the first pole tip 66/76. Milling of flat surfaces is very time-consuming as compared to side walls. Further, the top 124 in FIG. 8 requires extra height because of the long time required for milling. This extra height increases the aspect ratio (ratio between height of resist employed to frame plate the second pole tip 122 and the target track width), which reduces the line width of the second pole tip. Prior art methods of notching the first pole piece discussed in commonly assigned U.S. Pat. Nos. 5,438, 747 and 5,452,164 indicate a strong-felt need to reduce the time required for notching.

Figure 10:
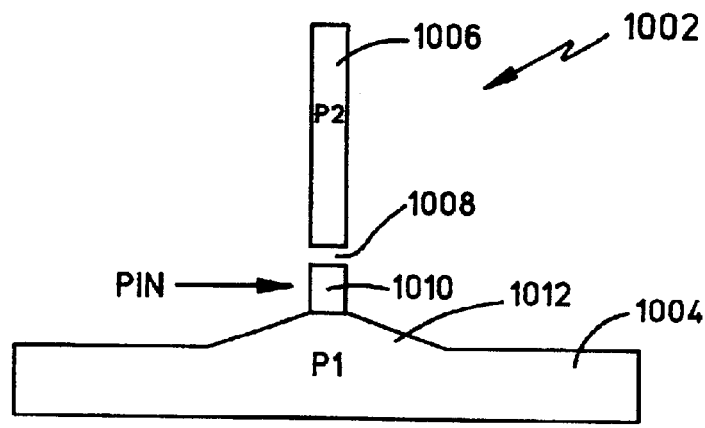
FIG. 10 is another ABS view of a prior art head formed with notches.

FIG. 10 shows another conventional magnetic head 1002, having a first pole piece 1004 and a second pole piece 1006 separated by a gap 1008. Between first pole piece 1004 and gap 1008 is a notched structure 1010 (P1N), which resides on raised and angled surface 1012 of first pole piece 1004. The surface 1012 is raised and angled due to the ion milling process to form the notches. Note that notched structure 1010 itself has "straight" side walls (i.e., side walls that are zero degrees relative to normal).

Figure 11:
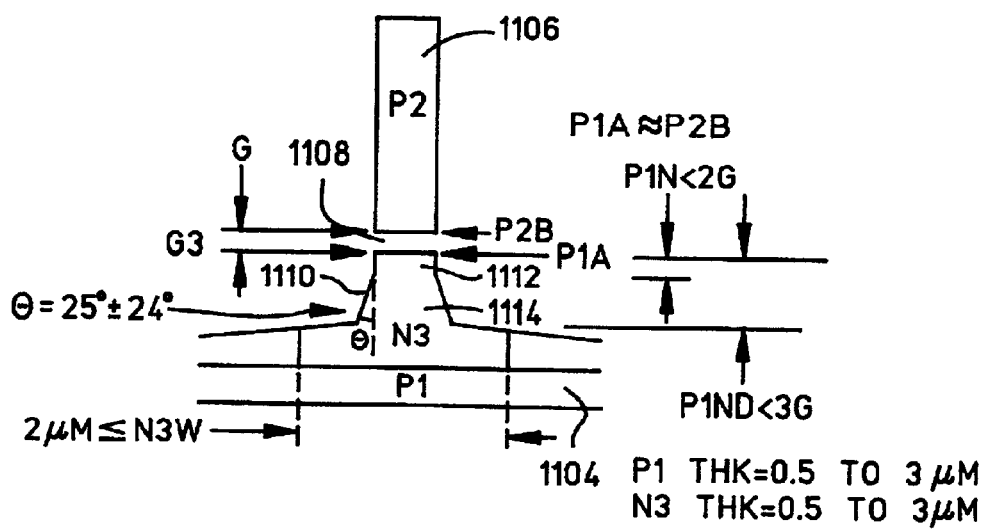
FIG. 11 is a magnetic head of the present invention.

In contrast with FIG. 10, FIG. 11 is one example of a magnetic head 1102 having a notched pole piece structure in accordance with the present invention. Magnetic head 1102 includes a first pole piece 1104 ("P1") and a second pole piece 1106 ("P2") separated by a gap 1108. Between first pole piece 1104 and gap 1108 is a central notched structure 1110 having angled side walls. By "angled," it is meant that the side walls slope outwardly at an angle greater than zero degrees (relative to normal). The angle at which the side walls slope is preferably 25 degrees±24 degrees. In decreasing order of generality, the angle may be 25 degrees±24 degrees; or 25 degrees±20 degrees; or 20 degrees±18 degrees; or 20 degrees±10 degrees; or between about 5–50 degrees. It has been observed that such angled side walls provide for an improved fringing field and overwrite capability as compared to the straight side walls of notched structure 1010 of FIG. 10. In this example, notched structure 1110 actually is formed of a top straight-walled portion 1112 having "straight" walls as well as a bottom angled-wall portion 1114 having the angled side walls. Below the bottom angled-wall portion 1114, bottom surfaces of notched structure 1110 have small outward downward slopes. As will be described below, the notched structure is made from a pre-plated structure which is subsequently milled.

Figure 12:
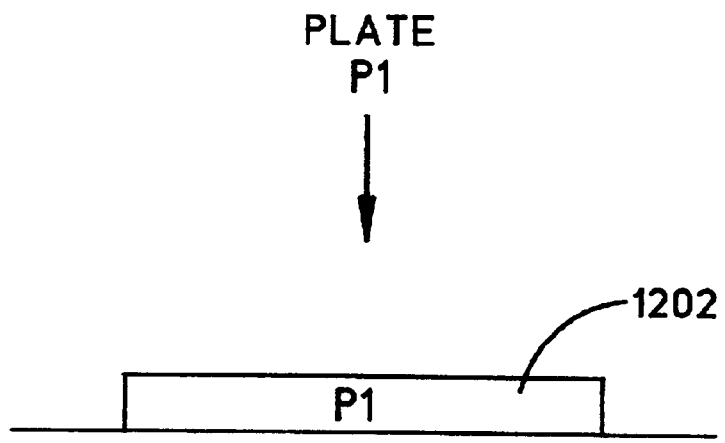
FIG. 12 is the first of a series of illustrations which are used to described a method of making a magnetic head in accordance with the present invention, which shows the formation of a first pole piece.
Figure 13:
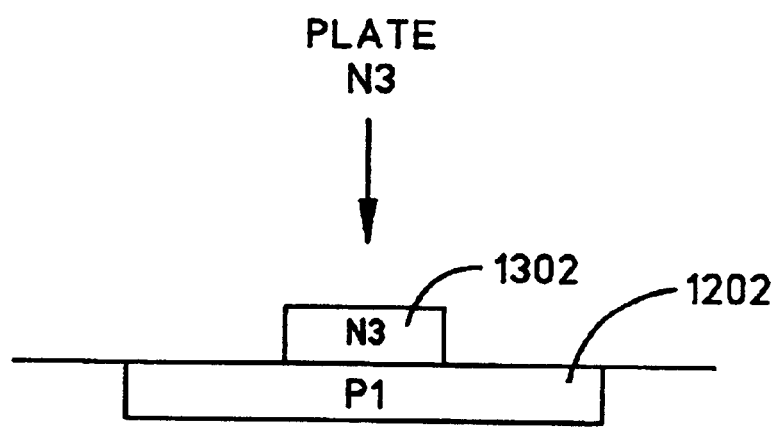
FIG. 13 is an illustration of that shown in FIG. 12 except that a plated pedestal has been electrically plated over a central portion of the first pole piece.

A method of making a magnetic head according to the present invention will now be described in relation to FIGS. 12–25. Beginning with FIG. 12, a first pole piece 1202 ("P1") is formed by frame plating. First pole piece 1202 is made of a magnetic material, preferably one with a high magnetic moment, such as nickel-iron (NiFe), cobalt (Co), or cobalt-iron-nitride (CoFeN). Next, in FIG. 13, a plated pedestal 1302 ("N3") is frame plated over a central portion of first pole piece 1202. Plated pedestal 1302 is made of a magnetic material, preferably one with a high magnetic moment, such as NiFe, Co, or CoFeN. Representative dimensions are shown in FIG. 13. Preferably, plated pedestal 1302 is plated to a thickness between about 1–4 $\mu$m, and preferably to a thickness of about 2 $\mu$m. The width of plated pedestal 1302 is preferably greater than 2 $\mu$m.

Figure 14:
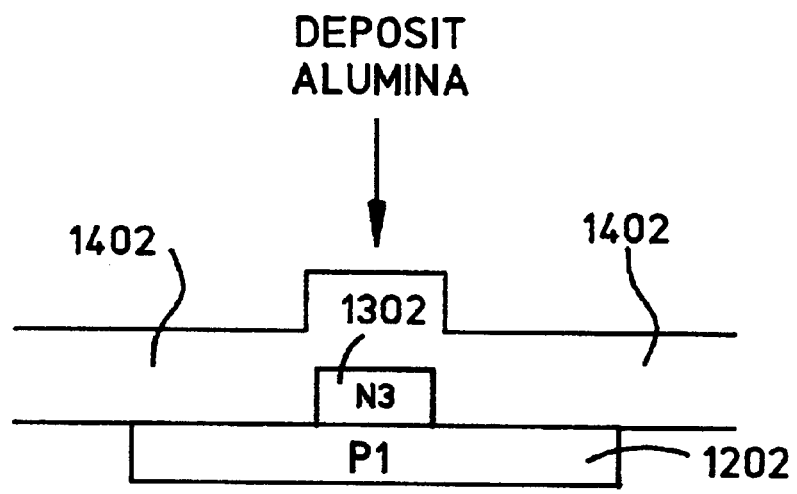
FIG. 14 is an illustration of that shown in FIG. 13 except that an insulator (e.g., alumina) has been deposited over the tops of the first pole piece and the plated pedestal.
Figure 15:
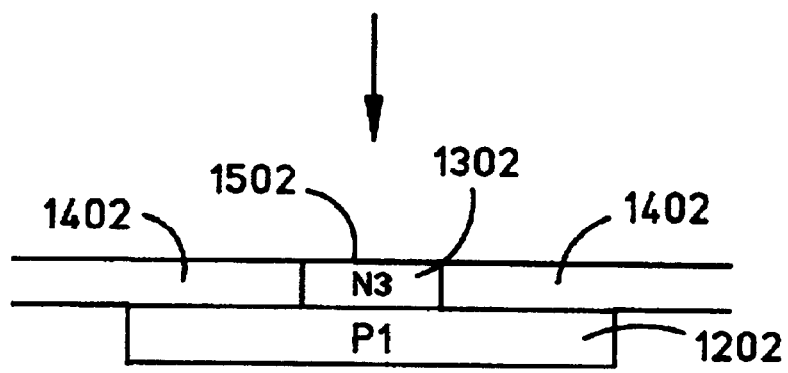
FIG. 15 is an illustration of that shown in FIG. 14 except that chemical mechanical polishing (CMP) has been performed over the top of the insulator to expose a top of the plated pedestal.

In FIG. 14, an insulator 1402 such as alumina ($Al_2O_3$) is then deposited over first pole piece 1202 and plated pedestal 1302. Preferably, in this embodiment insulator 1402 is deposited to a thickness that is about twice the thickness of plated pedestal 1302. Next, in FIG. 15, chemical mechanical polishing (CMP) is performed to expose a top 1502 of plated pedestal 1302 such that the top surfaces of both insulator 1402 and plated pedestal 1302 are flush, flat, and smooth.

Figure 16:
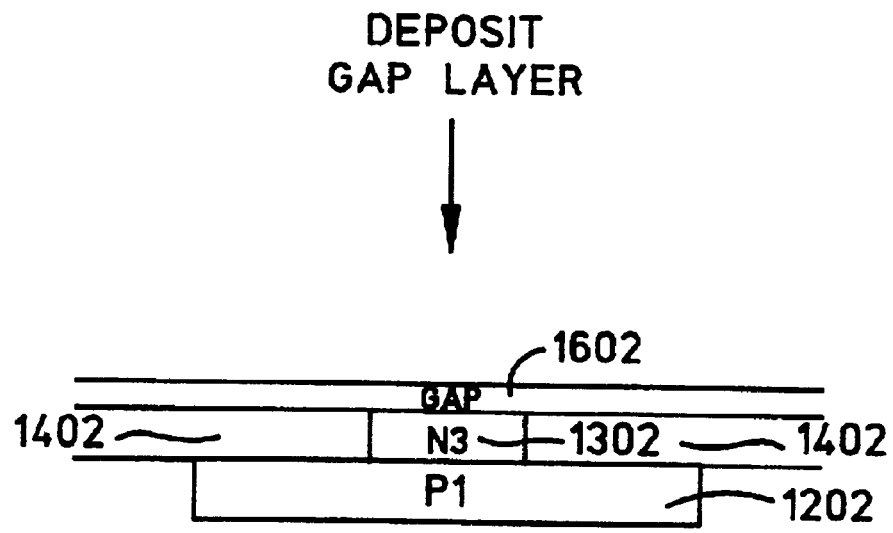
FIG. 16 is an illustration of that shown in FIG. 15 except that a gap layer has been deposited over the top of plated pedestal and the insulator.
Figure 17:
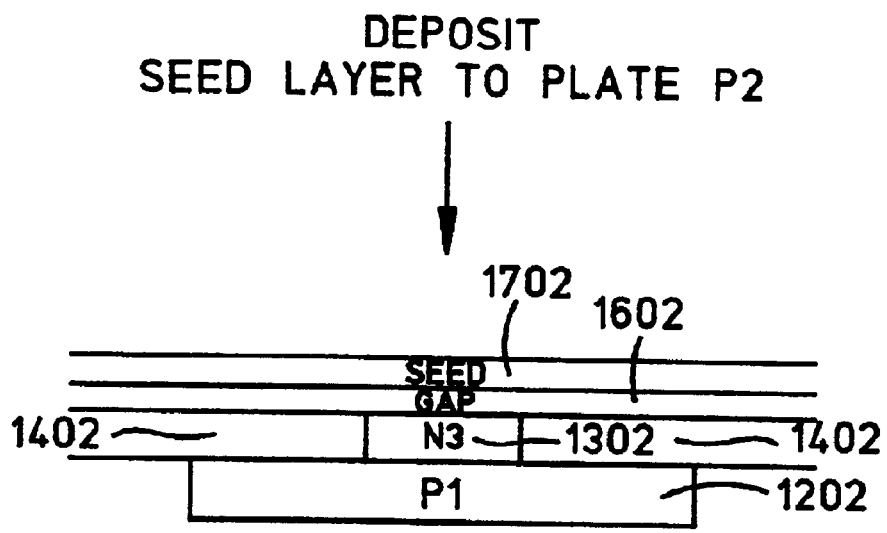
FIG. 17 is an illustration of that shown in FIG. 16 except that a seed layer has been deposited over the gap layer.

In FIG. 16, a gap layer 1602 ("gap") is then deposited over the flat top surface of insulator 1402 and plated pedestal 1302. Gap layer 1602 may be made of alumina ($Al_2O_3$) or other suitable dielectric material. The thickness of gap layer 1602 preferably varies between about 1000 and 2000 Angstroms, and in the present example it has a thickness of about 1600 Angstroms. In FIG. 17, a seed layer 1702 ("seed") is deposited over gap layer 1602. Seed layer 1702 is made of a magnetic material, and preferably one with a high magnetic moment, such as a NiFe, Co, or CoFeN. The thickness of seed layer 1702 preferably varies between about 400 and 4000 Angstroms, and in the present example it has a thickness of about 800 Angstroms.

Figure 18:
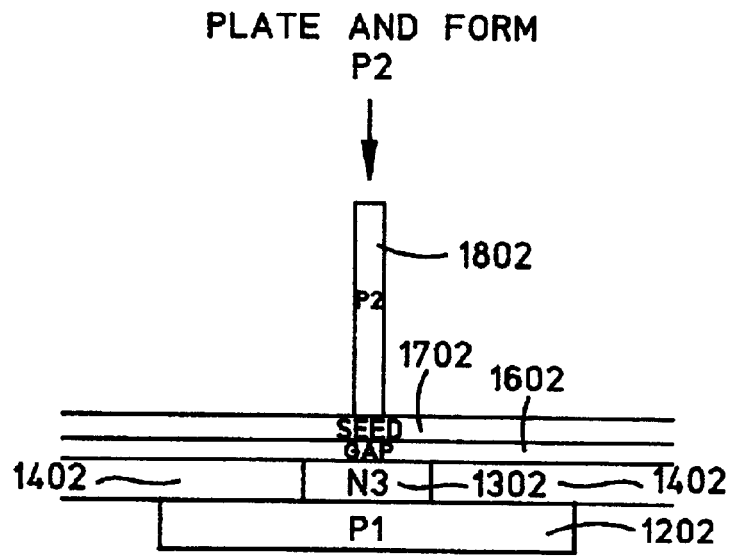
FIG. 18 is an illustration of that shown in FIG. 17 except that a second pole piece has been plated and formed over the seed layer.
Figure 19:
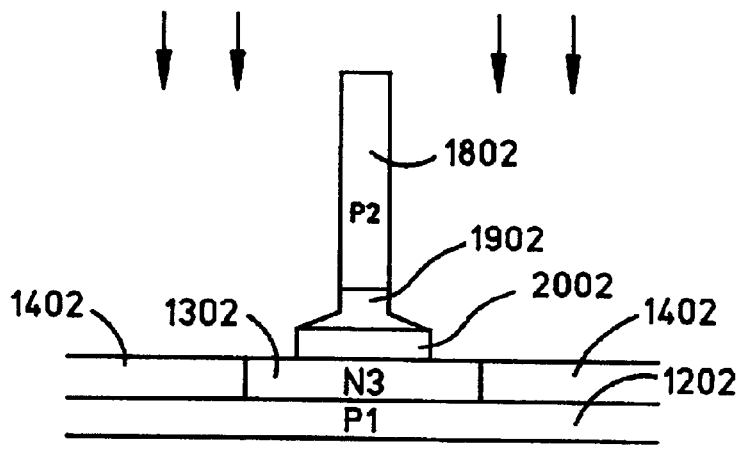
FIG. 19 is an illustration of that shown in FIG. 18 except that ion milling has been performed using the second pole piece as a mask to remove end portions of the seed layer and to form a central portion thereof, and subsequent reactive ion milling has been performed using the central portion of the seed layer as a mask to remove end portions of the gap layer and to form a central portion thereof.

Once gap layer 1602 and seed layer 1702 are deposited, a second pole piece 1802 ("P2") is plated and formed over a central portion of seed layer 1702 as shown in FIG. 18. This is done using well-known frame plating and photolithography techniques. As with first pole piece 1202, plated pedestal 1302, and seed layer 1702, second pole piece 1802 is made of a magnetic material, preferably one with a high magnetic moment, such as NiFe, Co, or CoFeN.

End portions of seed layer 1702 are then ion milled using second pole piece 1802 as a milling mask to leave a remaining central portion of seed layer 1902 (see FIG. 19) underneath second pole piece 1802. Given the dimensions of the present example, it may take about 3 to 10 minutes of ion milling time to form central portion 1902. Next, end portions of gap layer 1602 are reactive ion milled using central portion 1902 of seed layer as a milling mask to leave a remaining central portion 2002 of gap layer (see FIG. 19). Given the dimensions of the present example, it takes less than 10 minutes of reactive ion milling time to form central portion 2002 (which of course ultimately depends on the initial gap thickness, which here is between 0.4 and 2 $\mu$m). Any suitable gas can be utilized for the reactive ion milling, such as a mixture of argon gas and $CHF_3$, Freon, $CH_2F_2$, etc. In the present example, the gap layer is reactive ion milled until central portion 2002 has a width of about 0.3–1.0 $\mu$m.

Figure 20:
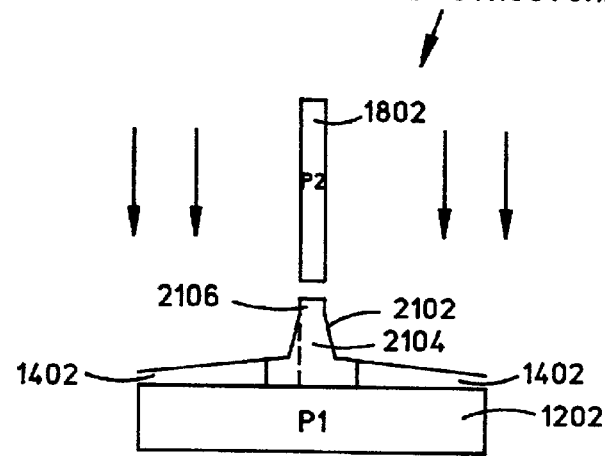
FIG. 20 is an illustration of that shown in FIG. 19 except that ion milling on the plated pedestal has been performed, using the central portion of the gap layer as a mask, to form a central notched structure having angled side walls.

Further ion milling through plated pedestal 1302 and alumina 1402 is performed to form a central notched structure 2102 shown in FIG. 20. Due to shadowing effects, and since central portion 2002 of gap layer (FIG. 19) is relatively wide and shrinks both in width and thickness during the milling process, plated pedestal 1302 is formed into notched structure 2102 shown in FIG. 20. This figure is the same as that shown in FIG. 11. As shown in FIG. 20, notched structure 2102 has an angled-wall portion 2104. Preferably, the angle of each side wall of angled-wall portion 2104 is about 25 degrees±24 degrees. Once the width of central portion 2002 is the same as width of second pole piece 1802, ion milling may be continued using second pole piece 1802 as a milling mask to form a straight-walled portion 2106 of notched structure 2104. Thus, central portion 1902 of seed layer (FIG. 19) is utilized as the mask during ion milling to form central portion 2002 of gap layer, which is subsequently used as the mask during ion milling of plated pedestal 1302 to form notched structure 2102 (FIG. 20).

Figure 21:
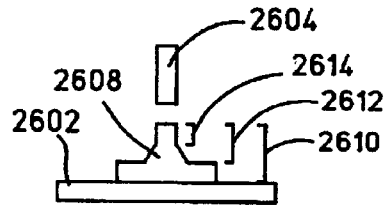
FIGS. 21–24 are other examples of a notched structure having angled side walls of the present invention.

The notched structure which is formed may take on a variety of shapes and dimensions, as shown in FIGS. 21–24. FIG. 21 shows a notched structure 2608 formed on a first pole piece 2602 which is adjacent a second pole piece 2604. As shown, notched structure 2608 has a bottom straight-walled structure, a middle angled-wall portion, and a top straight-walled portion. The angle of each angled side wall of the angled-wall portion is preferably 25 degrees±24 degrees. Notched structure 2608 has a total height 2610 of 0.1–0.5 $\mu$m, where the middle angled-wall and top straight-walled portions have a combined height 2612 of 0.3 $\mu$m and the top straight-walled portion alone has a height 2614 of less than 0.1 $\mu$m. The thickness of the gap is about 0.12 $\mu$m. The bottom straight-walled portion has a width that is much greater than the width of the angled-wall portion (e.g., 4 $\mu$m+the width of second pole piece 2604). The bottom straight-walled portion may alternatively have ends that extend all the way over the ends of first pole piece 2602 The top straight-walled portion has a width that is substantially the same as the width of second pole piece 2604.

Figure 22:
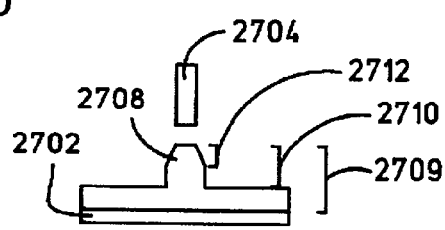

As another example, FIG. 22 shows a notched structure 2708 formed on a first pole piece 2702 which is adjacent a second pole piece 2704. As shown, notched structure 2708 has a bottom portion, a middle straight-walled portion, and a top angled-wall portion. No straight-walled portion above the top angled-wall portion is formed. The angle of each angled side wall of the top angled-wall portion is 25 degrees±24 degrees. Notched structure 2708 has a total height 2709 of 1–5 $\mu$m; the middle straight-walled portion and the top angled-wall portion have a combined height 2710 of 0.24 $\mu$m; and the top angled-wall portion alone has a height of 0.1–0.5 $\mu$m. The thickness of the gap is about 0.12 $\mu$m. The middle straight-walled portion has a width that is equal to the width of the bottom of the angled-wall portion, and the bottom portion has ends that extend over the ends of second pole piece 2702.

Figure 23:
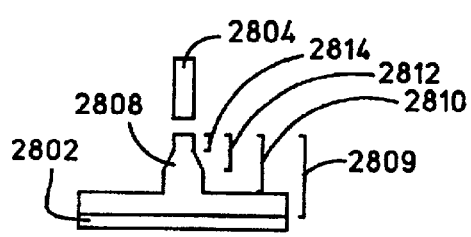

In yet even another example, FIG. 23 shows a notched structure 2808 formed on a first pole piece 2802 which is adjacent a second pole piece 2804. As shown, notched structure 2808 has a bottom portion, middle straight-walled portion, a middle angled-wall portion, and a top straight-walled portion. The angle of each angled side wall of the middle angled-wall portion is 25 degrees±24 degrees. Notched structure 2808 has a total height 2809 of 1–5 $\mu$m, where the middle and top portions have a combined height 2810 of 0.24 $\mu$m, the middle angled-wall portion and top straight-walled portion have a combined height 2812 of 0.1–0.5 $\mu$m and the top straight-walled portion alone has a height 2814 of 0–0.4 $\mu$m. The thickness of the gap is about 0.12 $\mu$m. The middle straight-walled portion has a width that is equal to the width of the bottom of the middle angled-wall portion. The top straight-walled portion has a width that is substantially the same as the width of second pole piece 2804.

Figure 24:
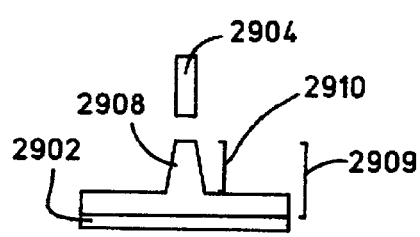

As a final example of this type, FIG. 24 shows a notched structure 2908 formed on a first pole piece 2902 which is adjacent a second pole piece 2904. As shown, notched structure 2908 has a bottom portion and a top angled-walled portion. The angle of each angled side wall of the top angled-wall portion is preferably 25 degrees±24 degrees. Notched structure 2908 has a total height 2909 of 1–5 µm, where the top angled-wall portion alone has a height 2910 of about 1.5 µm. The thickness of the gap is about 0.16 µm. The top of the top angled-wall portion has a width that is substantially the same as the width of second pole piece 2904.

Figure 25:
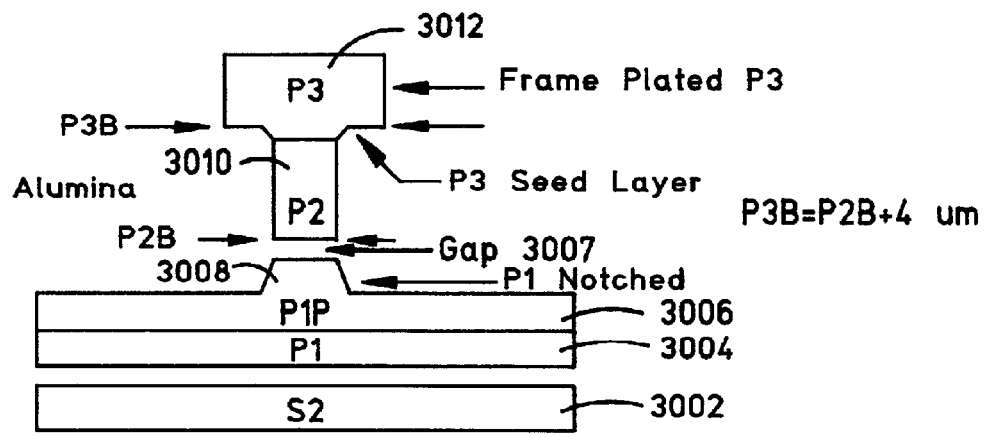
FIGS. 25–26 are other embodiments of a magnetic head of the present invention.
Figure 26:
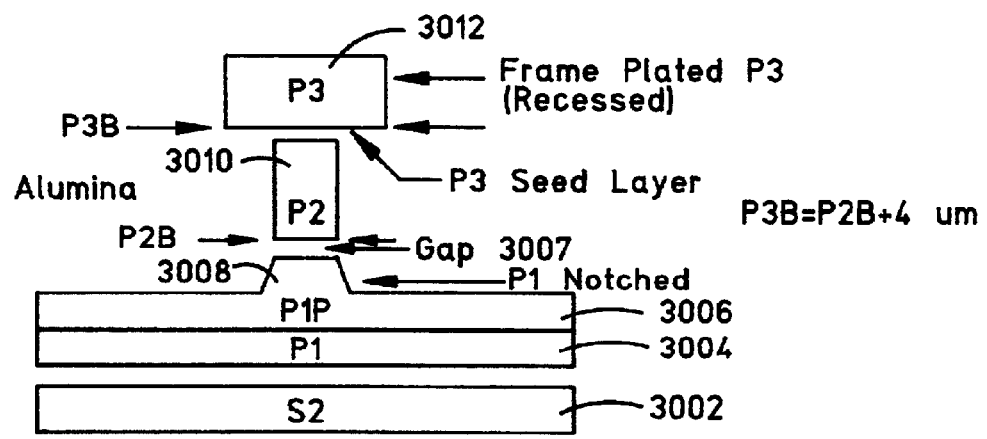

FIGS. 25–26 show another write head with a notched structure in an alternate embodiment. A first pole piece 3004 is formed over a shield 3002 and an notched structure 3006 having an angled-walled portion 3008 is formed over first pole piece 3004. A second pole piece 3010 is separated from notched structure 3006 by a gap 3007 and is adjacent a third pole piece 3012. Third pole piece 3012, which is frame plated over second pole piece 3010, also has an angled notched structure and is separated from second pole piece 3010 by a seed layer. The magnetic head in FIG. 31 is the same as that in FIG. 30 except that it is recessed from second pole piece 3010.

Thus, a magnetic head and a method of making the same have been described. The magnetic head includes a first pole piece; a second pole piece; a unique pre-plated notched structure formed over a central portion of the first pole piece; and a gap separating the notched structure from the second pole piece. Advantageously, the notched structure has angled side walls to provide for an improved fringing field and overwrite capability for the magnetic head. The angles of the side walls (relative to normal) may be 25 degrees±24 degrees; 25 degrees±20 degrees; 20 degrees±15 degrees; 20 degrees±10 degrees; or between about 5–50 degrees. The notched structure may include a top straight-walled portion over the angled-walled portion; a bottom straight-walled portion underneath the angled-walled portion; or both.

The method of making such a magnetic head may include the acts of frame plating a pedestal over a first pole piece; depositing an insulator over the first pole piece and plated pedestal; chemically mechanically polishing (CMP) the top of insulator to expose a top of the plated pedestal; depositing a gap layer over the top of insulator and plated pedestal; depositing a seed layer over the gap layer; forming a second pole piece over the seed layer; ion milling, using the second pole piece as a mask, so that end portions of the seed layer are removed and a central portion remains; reactive ion milling, using the central portion of the seed layer as a mask, such that end portions of the gap layer are removed and a central portion of the gap layer having a width that is greater than a width of the second pole piece is formed; and ion milling the plated pedestal using the central portion of the gap layer as a mask, to form a central notched structure having angled side walls.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of making a magnetic head, comprising the steps of:

plating a pedestal over a first pole piece layer;

depositing a gap layer over the plated pedestal;

depositing a seed layer over the gap layer;

forming a second pole piece over the seed layer;

milling, using the second pole piece as a mask, so that end portions of the seed layer are removed and a central portion remains;

milling, using the central portion of the seed layer as a mask, so that end portions of the gap layer are removed and a central portion remains; and milling, using the central portion of the gap layer as a mask, so that end portions of the plated pedestal are removed and a central notched structure having side walls with angled slopes is formed.

2. The method of claim 1, wherein the angled slopes of the side walls are formed by shadowing and a decreasing size of the central portion of the gap layer during the act of milling.

3. The method of claim 1, wherein each angled slope of a side wall is formed with an angle of 25 degrees±24 degrees relative to normal.

4. The method of claim 1, wherein each angled slope of a side wall is formed with an angle of 25 degrees±20 degrees to normal.

5. The method of claim 1, wherein each angled slope of a side wall is formed with an angle between about 5–50 degrees to normal.

6. The method of claim 1 wherein, from the step of milling, the central portion of the gap layer has a width that is greater than a width of the second pole piece.

7. The method of claim 1, wherein the step of milling so that end portions of the gap layer are removed comprises reactive ion milling.

8. The method of claim 1, further comprising:

prior to the steps of milling, depositing an insulator over the first pole piece layer and the plated pedestal.

9. The method of claim 1, further comprising:

prior to the steps of milling, depositing an insulator over the first pole piece layer and the plated pedestal; and chemically mechanically polishing (CMP) a top of the insulator to expose a top of the plated pedestal.

10. A method of making a magnetic head, comprising the steps of:

frame plating a pedestal over a first pole piece layer;

depositing a gap layer over the plated pedestal;

depositing a seed layer over the gap layer;

forming a second pole piece over the seed layer;

milling, using the second pole piece as a mask, so that end portions of the seed layer are removed and a central portion remains;

milling, using the central portion of the seed layer as a mask, so that end portions of the gap layer are removed and a central portion of the gap layer having a width that is greater than a width of the second pole piece remains; and milling the plated pedestal, using the central portion of the gap layer as a mask, to form a central notched structure having side walls with angled slopes of 25 degrees±24 degrees.

11. The method of claim 10, wherein the gap layer comprises an insulator and the seed layer comprises a magnetic material.

12. The method of claim 10, further comprising:

prior to the steps of milling, depositing an insulator over the first pole piece and the plated pedestal.

13. The method of claim 10, further comprising:

prior to the steps of milling, depositing an insulator over the first pole piece and the plated pedestal; and chemically mechanically polishing (CMP) a top of the insulator to expose a top of the plated pedestal.

14. The method of claim 10, wherein the step of milling so that end portions of the gap layer are removed comprises reactive ion milling.

15. A method of making a magnetic head, comprising the steps of:
   forming a first pole piece;
   plating a pedestal over the first pole piece;
   depositing a gap layer over the plated pedestal;
   forming a second pole piece over the gap layer;
   removing end portions of the gay layer by milling to form a central portion thereof which has a width greater than that of the second pole piece; and
   milling, using the central portion of the gap layer as a mask, the plated pedestal to form a notched structure having side walls with angled slopes.

16. The method of claim 15, further comprising:
   depositing a seed layer over the gap layer;
   milling, using the second pole piece as a mask, so that end portions of the seed layer are removed and a central portion remains; and
   milling, using the central portion of the seed layer as a mask, so that end portions of the gap layer are removed and the central portion thereof remains.

17. A magnetic head, comprising:
   a first pole piece;
   a second pole piece;
   a pre-plated pedestal formed over a central portion of the first pole piece;
   a gap separating the pre-plated pedestal from the second pole piece;
   the pre-plated pedestal being notched with angled side walls;
   the magnetic head, being made by the steps of;
      plating the pre-plated pedestal over the first pole piece;
      depositing a gap layer over the plated pedestal;
      depositing a seed layer over the gap layer;
      forming the second pole piece over the seed layer;
      milling, using the second pole piece as a mask, so that end portions of the seed layer are removed and a central portion remains;
      milling, using the central portion of the seed layer as a mask, so that end portions of the gap layer are removed and a central portion remains; and
      milling, using the central portion of the gap layer as a mask, so that end portions of the plated pedestal are removed and a notched structure having the angled side walls is formed.

18. The magnetic head of claim 17, which is made by the further steps of:
   prior to the acts of milling, depositing an insulator over the first pole piece and the plated pedestal; and
   chemically mechanically polishing (CMP) a top of the insulator to expose a top of the plated pedestal.

19. The magnetic head of claim 17, wherein milling such that end portions of the gap layer are removed comprises reactive ion milling.

* * * * *

UNITED STATES PATENT AND TRADEMARK OFFICE
CERTIFICATE OF CORRECTION

PATENT NO. : 6,947,255 B2
DATED : September 20, 2005
INVENTOR(S) : Hsiao et al.

It is certified that error appears in the above-identified patent and that said Letters Patent is hereby corrected as shown below:

<u>Column 11,</u>
Line 13, change "gay layer" to -- gap layer --;

<u>Column 12,</u>
Line 5, change "by the steps of;" to -- by the steps of: --.

Signed and Sealed this

Eleventh Day of April, 2006

JON W. DUDAS
*Director of the United States Patent and Trademark Office*